United States Patent [19]

Kosmal et al.

[11] Patent Number: 4,488,713

[45] Date of Patent: Dec. 18, 1984

[54] PNEUMATIC CLAMPING DEVICE

[75] Inventors: Brian A. Kosmal, Tipp City, Ohio; Frederick W. Auld, Fort Worth, Tex.

[73] Assignee: The United States of America as represented by the Secretary of the Air Force, Washington, D.C.

[21] Appl. No.: 475,664

[22] Filed: Mar. 15, 1983

[51] Int. Cl.[3] .............................................. B23P 15/26

[52] U.S. Cl. ...................................... 269/25; 269/48.2

[58] Field of Search .................... 269/25, 27, 49, 48.1, 269/48.2, 48.3, 48.4; 29/252, 253

[56] References Cited

U.S. PATENT DOCUMENTS 3,424,050 1/1969 Burrow et al. ..................... 269/48.4

3,507,028 4/1970 Stellatella ............................. 29/252

FOREIGN PATENT DOCUMENTS 749680 11/1944 Fed. Rep. of Germany ..... 269/48.2

*Primary Examiner*—Robert C. Watson

*Attorney, Agent, or Firm*—Donald J. Singer; John R. Flanagan

[57] ABSTRACT

A pneumatic clamping device used to clamp a plurality of sheets together includes a cylinder with a guide element at one end defining a pneumatic chamber within the cylinder and a piston having an elongated shaft, a cylindrical head on one end of the shaft and a clamping foot on an opposite end of the shaft. The piston head is movable within the cylinder chamber, while the piston shaft extends through the guide element and positions the piston foot for insertion through aligned holes in the sheets when the shaft is substantially extended from the cylinder. A coil spring is positioned in the cylinder chamber between one side of the piston head and an end of the cylinder opposite from its one end for biasing the shaft to its extended position. Pressurized air for a source thereof may be supplied to the cylinder chamber at an opposite side of the piston head for overcoming the bias force of the coil spring, resulting in retraction of the piston shaft and clamping of the sheets together between the foot and the cylinder.

1 Claim, 6 Drawing Figures

Fig. 1
Prior Art
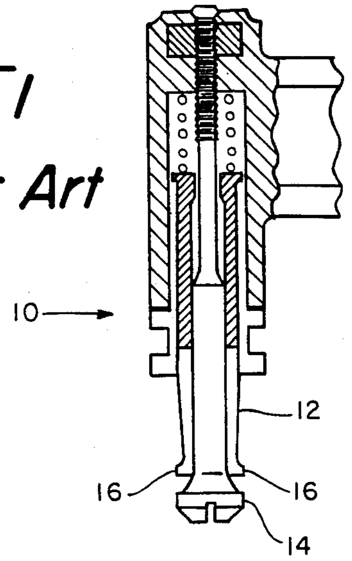
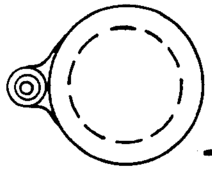
Fig. 6
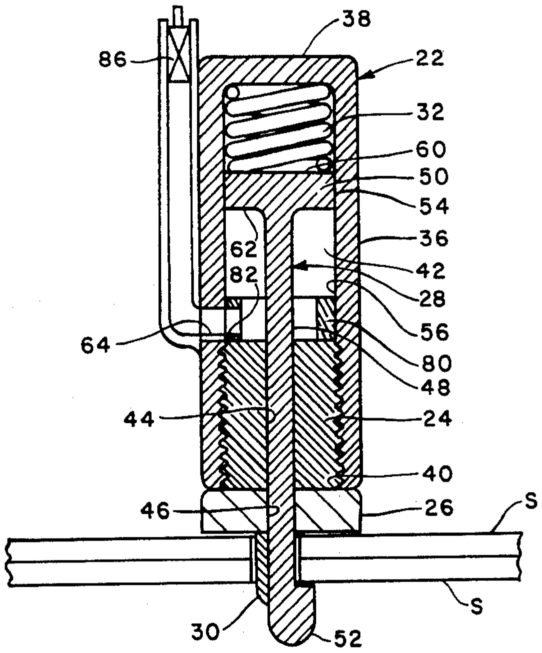
Fig. 5

PNEUMATIC CLAMPING DEVICE

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to techniques for clamping various types of structures during manufacturing thereof and, more particularly, is concerned with a pneumatic device for clamping parts of structures together while fastener holes are drilled through the structures.

2. Description of the Prior Art

Several approaches are disclosed in the prior art for clamping various structures, such as a pair of metal sheets, together. One approach employs a clamping mechanism 10 comprised by a collet 12 and a mandrel 14 shown in FIG. 1 which is used in conjunction with and as an integral part of a machine assembly called a drillmotor (not shown). The collet 12 must be inserted through a previously drilled hole to a depth so that the flanges 16 at the base of the collet are through the hole. A clamping force is applied when the tapered mandrel 14 is drawn upward into the slotted section of the collet. The force exerted by the mandrel 14 spreads the collet 12 to fill the hole and presses upward so that the collet flanges 16 bear against the lower surface of the part through which the collet was inserted. One such device is manufactured by Omark Industries and is known as a Spacematic Drillmotor.

Another approach utilizes a hand operated mechanical clamping device which exerts varying degrees of clamping force depending upon the torque applied to the device. This device is commonly referred to as a "cleeco" clamping device. Patents to Finkle, U.S. Pat. No. 2,280,403; Rossman, U.S. Pat. No. 2,371,470; Mooy, U.S. Pat. No. 2,388,603; Van Sittert, U.S. Pat. No. 2,397,892; Cole, U.S. Pat. No. 2,561,098; and Jones, U.S. Pat. No. 3,096,679, show clamping devices of the "cleeco" type.

Several disadvantages are inherent in these existing clamping approaches and deleterious effects result therefrom. The size of the collet and drillmotor assembly plus a template foot and tail pad which are integral parts of the assembly make the assembly unwieldly and restrict use of the assembly to large, open and uniformly contoured surfaces. An additional disadvantage to this device is that the collet grip ranges are limited and collets must be changed as various thicknesses of material are encountered during assembly operations. Disadvantages to the "cleeco" device are that the mechanical operations for its installation and removal are time consuming. Also, in most instances the device is not capable of applying a constant clamping force and frequently must be retorqued after initial installation to apply desired clamping force. A further disadvantage to the "cleeco" device is that the small footprint provided by this device at the point where the clamping force is applied to the understructure can inflict damage to the understructure if the "cleeco" device is overtorqued.

Therefore, a need exists for an improved device for clamping structures together which is easy to handle, has substantially universal application in not being limited by the shape of the structures, and will quickly and simply provide a constant, controlled clamping force.

SUMMARY OF THE INVENTION

The present invention provides a pneumatic clamping device designed to satisfy the aforementioned needs. The device is preferably portable, can be installed at a previously drilled fastener hole very quickly and is capable of exerting a constant controlled force for clamping two or more plies or sheets of material, such as metal, together. The constant clamping force is sufficient to prevent or minimize the formulation and disposition of chips and burrs of metal at the interface of two or more parts when fastener holes are drilled through the parts adjacent to the region of application of the clamping force. The pneumatic device is small, independently operated, quick acting, and easily installed. It can be operated on "shop air" (readily available pressurized air). The air pressure can be regulated to deliver a constant clamping force even when the parts to be clamped are assembled with a viscous sealant material applied to their faying surfaces.

Accordingly, the present invention provides a pneumatic clamping device for clamping together a plurality of sheets of material undergoing some manufacturing operation. The device comprises the combination of: (a) a cylinder defining a pneumatic chamber therein and an elongated central bore; (b) a piston having an elongated shaft, a head on one end of the shaft and a clamping foot on an opposite end of the shaft, with the piston head disposed for translatory movement within the chamber, the piston shaft extending through and movable along the central bore of the cylinder upon movement of the piston head, and the piston foot disposed outside of the cylinder and movable toward and away from the cylinder upon corresponding movement of the piston head and shaft; (c) means disposed in the chamber at a first side of the piston head and biasing the head for movement in a first direction to a first position wherein the piston shaft is substantially extended from the cylinder and the piston foot is disposed remote from the cylinder, allowing sufficient clearance for insertion of the foot through aligned holes in the plurality of adjacent sheets of material; and (d) a source of pressurized air connected to the chamber of the cylinder at a second, opposite side of the piston head and actuatable for forcibly moving the piston head against the biasing means wherein the piston shaft is substantially retracted into the cylinder and the piston foot is disposed adjacent to, but spaced from, the cylinder, forcibly clamping the sheets therebetween. The device further includes a positioning pin attached to the cylinder adjacent the elongated piston shaft and extending generally parallel thereto outside of the cylinder.

BRIEF DESCRIPTION OF THE DRAWINGS

FIG. 1 is a fragmentary view, partly in section, of the prior art clamping mechanism employing a collet and mandrel.

FIG. 5 is a side elevational view of an alternative embodiment of the pneumatic clamping device to the one shown in FIG. 2.

FIG. 6 is a top plan view of the device of FIG. 5.

DETAILED DESCRIPTION OF THE INVENTION

Figure 4:
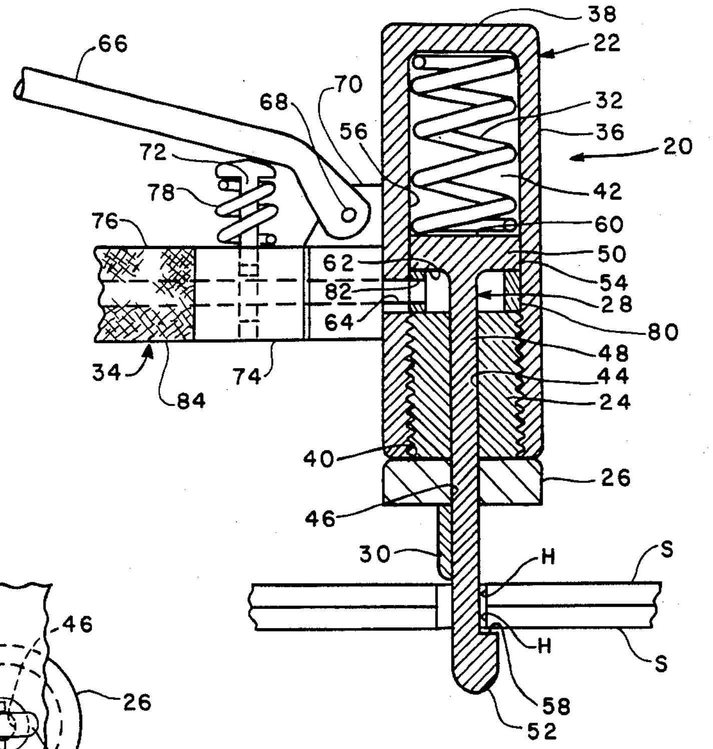
FIG. 4 is a side elevational view of the pneumatic clamping device similar to FIG. 2, but showing it prior to clamping the sheets together.
Figure 3:
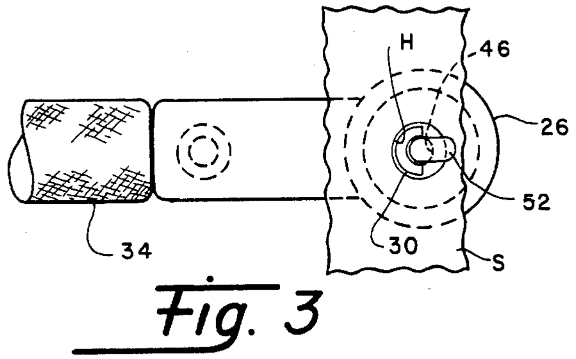
FIG. 3 is a bottom plan view of the device of FIG. 2, with the sheets being shown in fragmentary forms.
Figure 2:
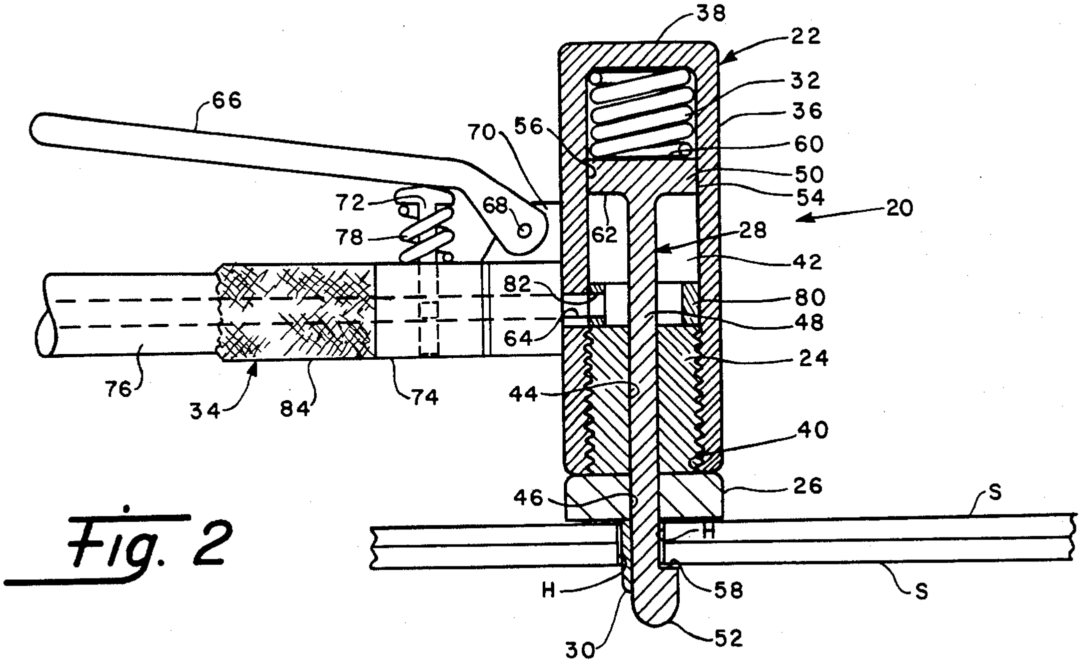
FIG. 2 is a side elevational view, partly in section, of a pneumatic clamping device embodying the principles of the present invention and showing it clamping a pair of sheets of material together.

Referring now to the drawings, and more particularly to FIGS. 2 through 4, there is shown the preferred embodiment of the pneumatic clamping device of the present invention, being generally designated 20. The pneumatic clamping device 20 includes a cylinder 22, a guide element 24, a bearing ring 26, a piston 28, a positioning pin 30, a coil spring 32, and a source of pressurized air 34.

The cylinder 22 is formed by a hollow cylindrical housing 36 having a closed end 38 and an opposite open end 40. The guide element 24 is externally threaded and is installed into the complementarily internally threaded open end 40 of the housing 36. The guide element 24 in such location is spaced from the closed end 38 of the housing 36 such that a pneumatic chamber 42 is defined therebetween within the cylinder housing 36. Also, the cylindrical guide element has a central bore or opening 44 extending through it.

The bearing ring 26 is attached to the guide element 24 and disposed outside of the cylinder housing 36. The ring 26 has a central opening 46 which is aligned with the central opening 44 of the guide element 24.

The piston 28 includes an elongated shaft 48, a cylindrical head 50 on one end of the shaft 48, and a clamping foot 52 on an opposite end of the shaft 48. The outer cylindrical surface 54 of the piston head 50 forms an air-tight seal with the interior cylindrical surface 56 of the cylinder housing 36, and furthermore is disposed for translatory, rectilinear sliding movement within the pneumatic chamber 42. The piston shaft 48 extends through the aligned openings 44 and 46 of the guide element 24 and bearing ring 26, respectively, in an air-tight sealing relationship therewith. Also, the piston shaft moves relative to the guide element and bearing ring upon movement of the piston head within the chamber. The piston foot 52, which preferably defines an offset ledge 58, is disposed on the end of the piston shaft 48 which extends beyond the bearing ring 26 outside of the cylinder 22. The foot is movable toward and away from the bearing ring upon corresponding movement of the piston head and shaft.

The positioning pin 30 is attached outside of the cylinder 22 to, and extends downwardly from, the bearing ring 26 at a location adjacent to one side of the central opening 46 through the ring 26, as best seen in FIG. 3. In such position, the pin 30 extends substantially parallel to the piston shaft 48 extending from the ring opening 46.

The compressible coil spring 32 and the source of pressurized air 34 are provided for applying force to first and second opposing sides 60, 62 of the piston head 50 respectively for moving the piston 28 in opposite directions. On the one hand, the coil spring 32, which is disposed within the chamber 42 between the first side 60 of the piston head 50 and the closed end 38 of the cylinder housing 36, biases the piston 28 for movement in a first direction away from the closed cylinder end 38 and toward the guide element 24. On the other hand, through actuation of the pressurized air source 34, which is connected at orifice 64 to the cylinder chamber 42 between the guide element 24 and the second side 62 of the piston head 50, the piston 28 is forcibly moved against the coil spring 32 in an opposite second direction away from the guide element 24 and toward the closed end 38 of the cylinder housing 36.

The pressurized air source 34 is actuated and deactuated by pressing down on and releasing a handle 66 which is pivotally mounted at 68 to a tab 70 fixed to the cylinder housing 36. When the handle 66 is pressed downward, the stem 72 of a valve 74 moves downward to open the valve, allowing pressurized "shop" air to enter the cylinder chamber 42 from supply hose 76. When the handle 66 is released, a compressed coil spring 78 which surrounds the valve stem 72 moves the latter upwardly to close the valve 74 and block flow of pressurized air to the cylinder chamber 42. Instead, compressed air from the chamber 42 is now allowed to evacuate from the chamber to the atmosphere through a suitable passageway (not shown) in the valve stem 72.

In using the pneumatic clamping device 20, it is desired that a clamping force applied to two or more sheets, plies or layers of material S such as steel sheet material, be sufficient to extrude a viscous faying surface sealant (not shown) from between the layers S to prevent metal chips or burrs from accumulating at their interface as the next fastener hole or the like is drilled through the sheets adjacent to the device 20. A prerequisite to the use of the clamping device 20 is that at least one fastener hole through each sheet or layer S must exist at the start. The clamping action necessary for drilling the first hole through the layers S without accumulating chips and burrs at their interface can be accomplished through use of prior art mechanical clamping devices such as C-clamps or toggle clamps which are commonly used in the manufacture of aircraft structures.

To use the device 20, the handle 66 must be in a released condition wherein the pressurized air is allowed to exhaust from the cylinder chamber 42 and coil spring 32 extends the piston shaft 48 when the spring forces the head 50 of the piston 28 to a first position adjacent the guide element 24, as seen in FIG. 4. At such first position a spacer ring 80 within the chamber maintains the piston head 50 in a spaced relationship away from the guide element 50 so as not to block the orifice 64. The ring 80 has an opening 82 aligned with the orifice 64. The offset piston foot 52 is now disposed remote or away from the positioning pin 30 which provides clearance therebetween sufficient to allow easy insertion of the piston foot and an adjacent portion of the piston shaft through the aligned holes H in the layers of material S.

Once the foot 52 has been inserted, the positioning pin 30 approximately aligned with the holes H (it was misaligned with them during insertion of the foot due to the latter's offset relationship with the pin 30), and then inserted into the holes, the handle 66 may be depressed to open the valve 74 and supply pressurized air to the cylinder chamber 42.

The air pressure within chamber 42 overcomes the biasing force of coil spring 32 and the piston is moved from its first position of FIG. 4 to a second position shown in FIG. 2. As the piston head 50 moves away from the guide element 24 and toward the closed end 38 of the housing 36 to the second position shown in FIG. 2, the piston shaft 28 is retracted into the cylinder 22 and the offset piston foot 52 becomes disposed adjacent to the positioning pin 30 such that its ledge 58 hooks the bottom one of the material plies or layers S and in conjunction with the pin 30, the portion of the piston shaft 28 adjacent to the foot 52 substantially fills the aligned holes H. Furthermore, in conjunction with the bearing ring 26, the ledge 58 of the foot 52 forcibly exerts a uniform pressure, clamping the sheets of material together. So long as the handle 66 is maintained depressed, as seen in FIG. 2, the clamping force will remain constant. When the handle is released, the clamping force is almost instantaneously removed from the sheets. A quick disconnect coupling 84 is provided to connect and disconnect the "shop air" supply hose 76 to and from the cylinder 22 of the device 20.

As mentioned above, the clamping action will be exerted between the bearing ring 26 and the upper surface or ledge 58 of the offset foot 52. The diameter of the offset foot will be slightly less than the diameter of the existing hole H through which the offset foot 52 is installed. The piston shaft 48 and positioning pin 30 are configured so that when the clamping force is applied, the offset foot 52 is drawn toward the existing hole H and the combined cross-sections of shaft 48 and positioning pin 30 fill hole H and hold the offset foot 52 securely in the desired clamping position.

A possible modification may be made to the valve 74 such that by squeezing handle 66 downward valve 74 opens and delivers "shop air" pressure into chamber 42. Valve 74 will remain open, even though handle 66 is released, until the handle 66 is squeezed downward a second time. This second motion will close the inlet port of the valve and open an exhaust port which will relieve the pressure in chamber 42 and allow the piston 28 to be moved downward by spring 32 and release the clamping force.

Another modification to the preferred embodiment of the invention is shown in FIGS. 5 and 6. The hardware and operation of the clamping device is the same as that shown and described previously except the handle 66, valve 74 and quick disconnect coupling 84 are replaced with a manual check valve 86. The clamping device will be actuated by applying pressurized "shop air" at the check valve 86. The clamping force will remain until the supply of pressurized air is removed and pressure in chamber 42 is relieved by opening check valve 86.

A further modification to the preferred embodiment could be accomplished by replacing the offset foot 52 and positioning guide or pin 30 with a collet and mandrel per se. This modification would provide a method for applying uniformly distributed bearing pressure around the periphery of the hole in cases where such a uniform distribution is considered advantageous.

Thus, the clamping device of the present invention provides an improved composite unit composed of the combination of a pneumatic cylinder, a clamping foot (or collet and mandrel) and a system of inlet and exhaust valves for the control of pneumatic pressure within the cylinder. This clamping device provides substantial advantages over present methods because of the fact that this device can be installed and operated as a separate, portable and independently controlled clamping device as opposed to prior devices which are operated in conjunction with a drill-motor and which require an unwieldy template foot and tail pad.

Although only the preferred embodiment of the device for carrying out the invention and several slight modifications thereof have been described above, it is not to be construed that this invention is limited to such embodiments. Other modifications may be made by those skilled in the art without departing from the spirit and scope of the invention defined below.

Having described the invention, what is claimed is:

1. A pneumatic clamping device, comprising:

(a) a cylinder formed by a hollow housing having a closed end and an opposite open end;

(b) a guide element secured in said opposite end of said cylinder housing and spaced from said closed end thereof such that between said guide element and said closed cylinder end a pneumatic chamber is defined within said cylinder housing, said guide element having an elongated central bore;

(c) a bearing ring attached to said guide element and disposed outside of said cylinder housing, said ring having a central opening aligned with said central bore of said guide element;

(d) a piston having an elongated shaft, a cylindrical head on one end of said shaft and an offset foot on an opposite end of said shaft, said piston head disposed for rectilinear sliding movement within said chamber of said cylinder housing, said piston shaft extending through and movable along said central bore and opening of said guide element and bearing ring respectively upon movement of said piston head, and said offset piston foot disposed beyond said bearing ring outside of said cylinder and movable toward and away from said bearing ring upon corresponding movement of said piston head and shaft;

(e) a positioning pin attached to and extending from said bearing ring adjacent said central opening of said ring and outside of said cylinder, said pin also extending substantially parallel to said piston shaft extending from said ring opening;

(f) a compressible coil spring disposed between said piston head and said closed end of said cylinder housing, and biasing said piston head for movement in a direction away from said closed end of said cylinder housing and toward said guide element to a first position located adjacent to said guide element wherein said offset piston foot is disposed remotely from said positioning pin and bearing ring, allowing sufficient clearance for insertion of said piston foot and an adjacent portion of said piston shaft through aligned holes in a plurality of adjacent sheets of material; and (g) a source of pressurized air connected to said chamber of said cylinder housing between said guide element and said piston head and actuatable for forcibly moving said piston head against said coil spring in an opposite direction away from said guide element and toward said closed end of said cylinder housing to a second position located remote from said guide element wherein said offset piston foot is disposed adjacent to said positioning pin and bearing ring such that in conjunction with said positioning pin substantially fill said aligned holes in said sheets of material, while in conjunction with said bearing ring forcibly clamp said sheets of material together.

* * * * *